US008294732B2

(12) United States Patent
Cheng et al.

(10) Patent No.: US 8,294,732 B2
(45) Date of Patent: Oct. 23, 2012

(54) CONTEXTUAL CAMERA METHOD AND APPARATUS FOR VIRTUAL ENVIRONMENTS

(75) Inventors: Li-Te Cheng, Malden, MA (US); Steven L. Rohall, Winchester, MA (US); John F. Patterson, Carlisle, MA (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 12/053,732

(22) Filed: Mar. 24, 2008

(65) Prior Publication Data

US 2009/0237518 A1 Sep. 24, 2009

(51) Int. Cl.
G09G 5/00 (2006.01)
(52) U.S. Cl. ........................................ 345/619; 345/633
(58) Field of Classification Search .................. 345/418, 345/619, 633, 474; 463/32, 33, 43; 715/706
See application file for complete search history.

(56) References Cited

U.S. PATENT DOCUMENTS

| 6,917,370 | B2 * | 7/2005 | Benton | 345/633 |
| 8,065,200 | B2 * | 11/2011 | Schwartz | 705/27.1 |
| 2004/0229701 | A1 * | 11/2004 | Gavin | 463/43 |
| 2008/0309671 | A1 * | 12/2008 | Shuster et al. | 345/474 |
| 2010/0070859 | A1 * | 3/2010 | Shuster et al. | 715/706 |

OTHER PUBLICATIONS

Sabri, H. et al., "Virtual Reality-Based Interface for the Control of Multiple Surveillance Cameras", HAVE 2007—IEEE International Workshop on Haptic Audio Visual Environments and their Applications; Oct. 12-14, 2007, p. 1-4.*
Ng, Kim et al., "Multiple Omni-Directional Vision Sensors (ODVS) based Visual Modeling Approach", Department of Electrical and Computer Engineering, University of California, San Diego, p. 1-4.*

* cited by examiner

*Primary Examiner* — Chante Harrison
(74) *Attorney, Agent, or Firm* — Hamilton, Brook, Smith & Reynolds, P.C.

(57) ABSTRACT

A computer method and apparatus control virtual environment cameras based on context. Current context is detected in a subject virtual environment. As a function of detected context, a set of predefined camera views is provided and displayed for user selection. Upon user selection of a camera view from the provided and displayed set of predefined camera views, a camera of the subject virtual environment is updated. The camera view is changed to the user selected camera view. There is ongoing detection of context and indicating of candidate camera views based on context, for user selection and update of the camera view.

22 Claims, 4 Drawing Sheets

(CAMERA VIEW 41)

CONTEXTUAL CAMERA METHOD AND APPARATUS FOR VIRTUAL ENVIRONMENTS

BACKGROUND OF THE INVENTION

Virtual Worlds and 3-D games such as Second Life, There, World of Warcraft, The Movies, etc offer controls for the user to manipulate the camera in 3-D environments. Effective camera control is important to the user experience of such systems, as they allow the user to properly view content without obstructions, view content in multiple locations beyond the avatar's current location, and help the user plan out navigation. The traditional approaches to controlling the camera are as follows:

Automatic camera positioning: an algorithm automatically computes an optimal positioning of the camera depending on the context of what is being viewed. The user has no direct control over the camera, although the user's actions in the environment (e.g. walking around) may influence the algorithm's decision of camera position. Many popular 3-D games and virtual worlds employ this technique to implement an "over-the-shoulder" camera of the user's avatar in the environment. "There"—a social virtual world—uses a sophisticated algorithm to optimally place a camera to try to fit all participants in a conversation and even precomputes cinegraphic cuts and close-ups. The drawback of this approach is the algorithm may not always be successful in finding an optimal camera position, and the user must take indirect measures to try to "fix" the problem (e.g. camera may get "stuck" on an object, and the user must move the character frantically around to "unglue" the camera).

Manual camera positioning: a user interface to directly control every aspect of the camera's position and angle is offered to the user. Typically, this is done using some combination of keyboard and mouse actions, or via a special controller (e.g. Nintendo Wii controller, gamepad, etc). Many popular 3-D games offer this to the user. This provides significant flexibility for the user to find the optimal camera position and angle. However, manually setting up a camera may be time-consuming, and may require a time investment to learn a set of controls just to view the scene.

Choice of preset cameras: an environment may have one or more camera positions and angles predefined in advance by the designer for optimal viewing. The user selects the appropriate camera via a menu or hotkeys. This is common in many single or multi-user 3-D games, such as flight simulators (e.g. "chase cam" view, "nosecone" view, etc), sports games (e.g. "goalie" view, "driver" view), etc. Preset cameras make the camera control problem a fast decision of picking an appropriate camera, at the cost of the possibility that none of the camera choices are desirable. Another drawback is that the user needs to remember the menu or hotkey command to switch to desired camera positions. Certain types of games and virtual worlds offer a thumbnail view of another camera in case the user does need to switch (e.g. a thumbnail of the overhead map view, a rear-view mirror for a driving game), or is based on natural object selection (e.g. a game that lets the user equip binoculars will switch the camera to a binocular view).

SUMMARY OF THE INVENTION

Applicants contend that (i) for casual users of virtual worlds, automatic camera positioning may be adequate for navigation but may not be reliable when the user wants another perspective on the virtual environment, (ii) manual camera positioning is too time-consuming and cumbersome, and that (iii) a choice of preset cameras points to a possible solution. The present invention specifically addresses the issue of producing a desirable set of camera choices by offering options specific to the current context: i.e. the user's environment, objects of interest in the scene, camera views that others find interesting, and specific to a moment of interest in the past.

The present invention introduces the notion of contextual cameras for virtual environments. Forming the invention contextual cameras is a set of preset camera views, with the following characteristics:

Visibility: Each camera view is portrayed as a live feed in a thumbnail to the user. Clicking on or otherwise selecting the camera view changes the current view to the selected camera view.

Manageability: The set of camera views visible to the user is limited to a number that does not overwhelm the user interface, and redundant views are filtered out.

Contextual by place: Some camera views are offered from a set of predefined angles in the user's (avatar's) current place in the virtual environment.

Contextual by objects: Some camera views are offered from a set of predefined angles based on objects of interest visible to the user in the virtual environment.

Contextual by avatars: Some camera views are offered from a set of predefined angles based on avatars of interest visible to the user in the virtual environment.

Contextual by current activities: Some camera views are offered from a set of predefined angles based on the activity/task/workflow of interest currently engaged by the user or by other users in the immediate vicinity.

Contextual by other users' choices: Camera views that have been used, or are currently being used by other users in the same place are indicated.

Contextual by past navigation or activity: Some camera views that are offered are based on places, people, objects, activities, and other camera selections the user has selected in the past. Clicking on or otherwise selecting the camera view not only changes the current view to the selected camera view, but may potentially move the user back to a previous location, to a previous person, etc associated with the camera view. In essence, this is the equivalent of the "back" button of a web browser, but with a camera preview associated with it.

Shareable: Users' camera choices are visible to others in the virtual environment, and can be saved and distributed for immediate or later use by others (e.g. newcomers who may want to use these cameras).

In one embodiment, a computer method of controlling virtual environment cameras comprises:

determining current context in a subject virtual environment;

as a function of determined context, providing a set of predefined camera views;

enabling user selection of a camera view from the provided set of predefined camera views; and updating a camera of the subject virtual environment according to user selected camera view.

In another embodiment, a controller of a computer-based virtual environment camera comprises:

computer apparatus for controlling virtual environment cameras, comprising:

a detector determining current context in a virtual environment;

a source of predefined camera views, the source providing different sets of predefined camera views for different respective context;

a display member responsive to the detector and displaying to a user a set of predefined camera views as a function of determined current context, for selection of a camera view by the user; and a controller responsive to user selection of a camera view from the displayed set, the controller changing camera view of the virtual environment based on the user selected camera view.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
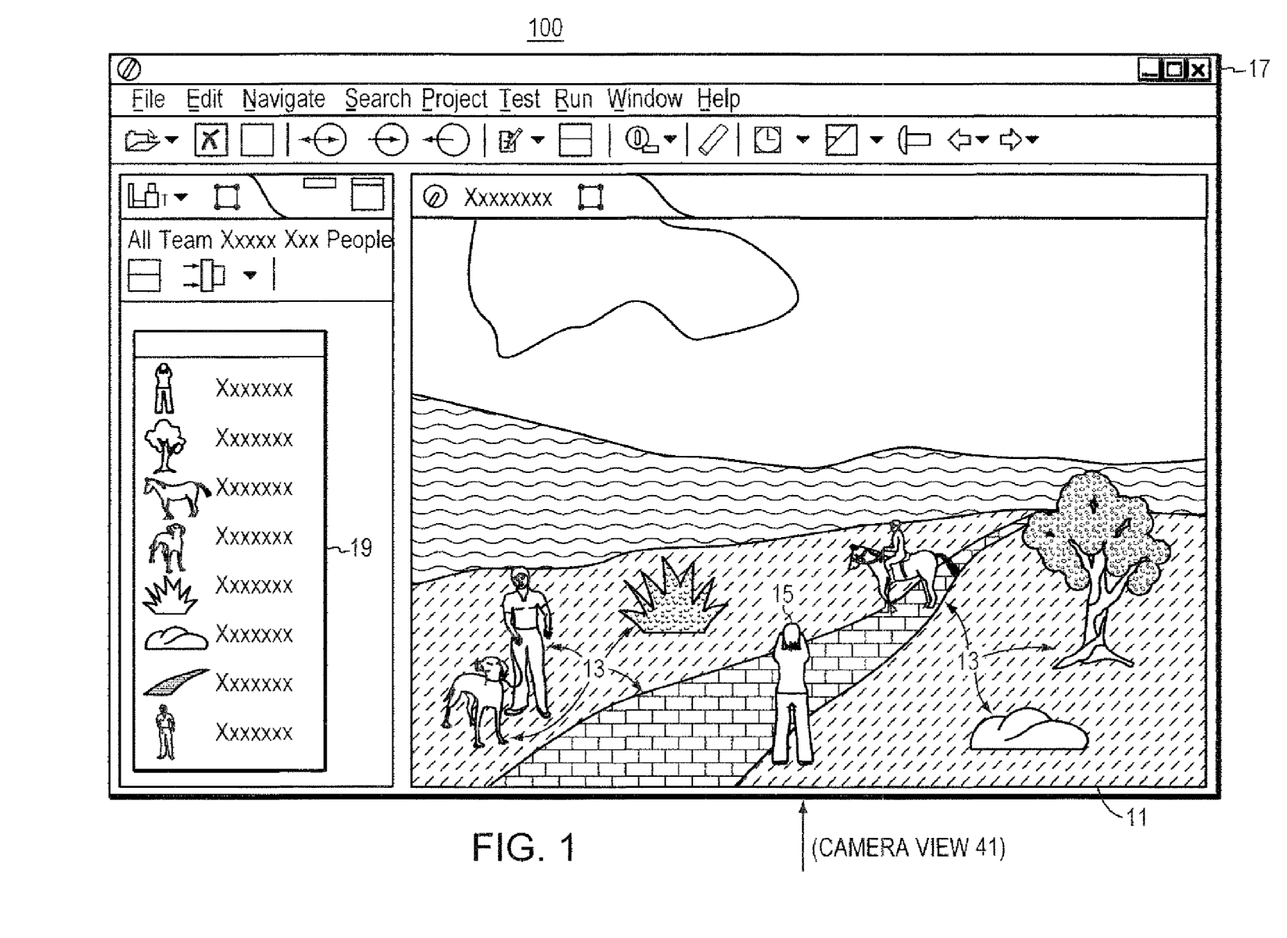
FIG. 1 is a schematic view of a virtual world/environment as displayed in a screen view to an end-user.

Illustrated in FIG. 1 is a sample screen view 17 of a virtual world (generally virtual environment) 11 as output on a display monitor to an end user. For a given screen view 17, the point of view of the virtual environment 11 may be through the eyes of an observer (outsider) of the virtual world 11 or of an avatar (or other acting character) 15 in the virtual world 11, as captured through a hypothetical camera. Thus the displayed screen view 17 of the virtual world 11 is defined in large part as a function of the camera view 41 (and in part as a function of character 15 or object 13 activity in the virtual environment 11).

The "observer", the avatar or other acting character in the virtual environment 11 represents the user, and the camera in the present invention is positioned over the shoulder of the user's avatar 15 or overhead (birds eye view) or other position ("nosecone" view, "goalie" view, "driver" view, etc.) as a function of context. In the screen illustrated in FIG. 1, the camera view 41 is from behind and over the shoulder of the user avatar 15. Thus, the screen view 17 shows the user avatar, with his back facing out of the display screen. Camera view is generally indicated with a dashed line arrow 41.

The invention system 100 defines current context as any one or combination of the user's avatar's/character's 15 environment, objects 13 (including other user's avatars) of interest (as expressed by the user through his avatar 15 or otherwise) in the scene, camera views that other users' find/have found interesting and a specific moment of interest in the past.

Figure 2:
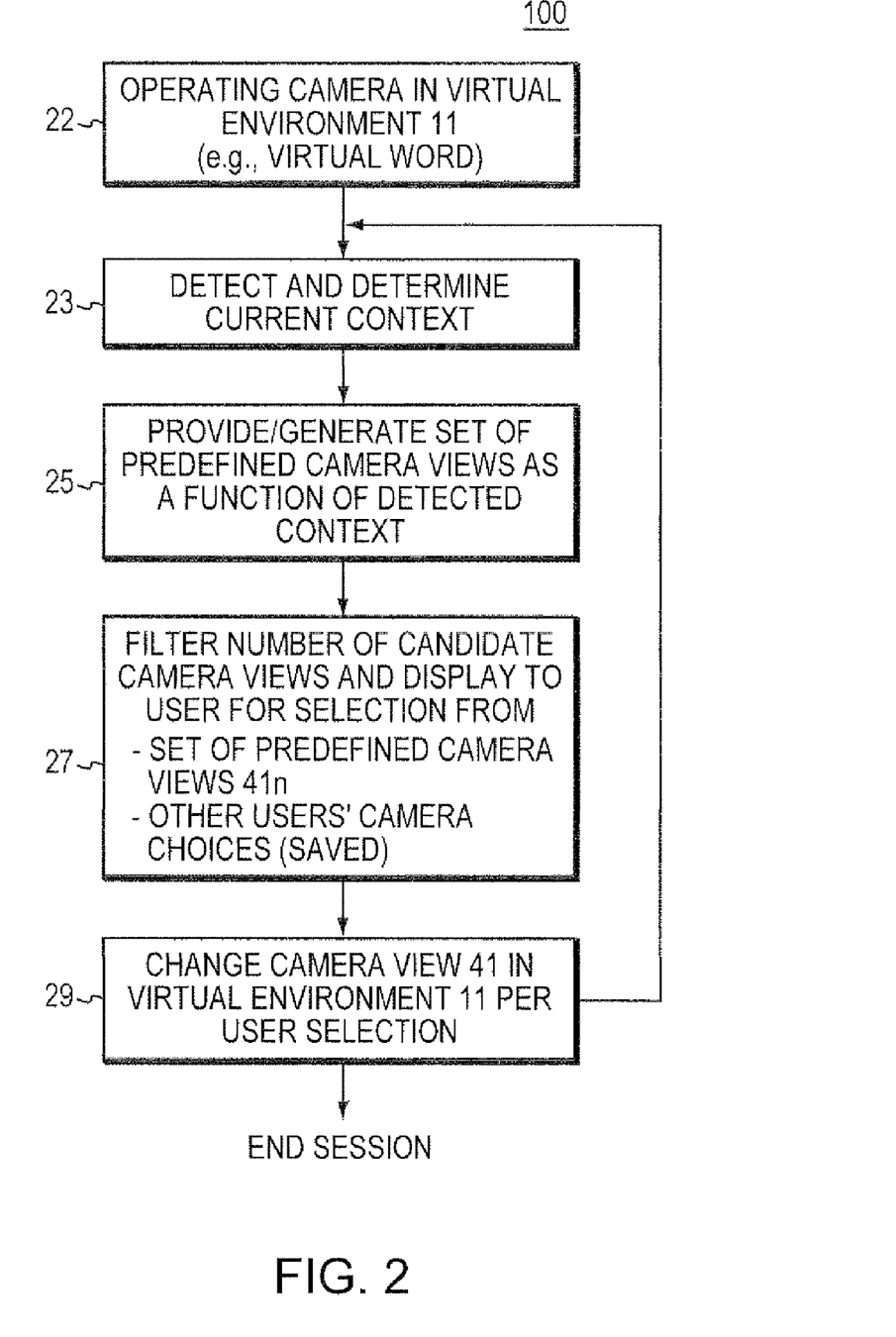
FIG. 2 is a flow diagram of one embodiment of the present invention.

Generally the camera is implemented using known techniques for virtual environment systems. In addition, as a function of current context, the present invention virtual camera control system 100 provides a set of preset (or predefined) camera views 41n (FIG. 2). For different contexts, there is a respective set of predefined camera views 41n. In a preferred embodiment, each set of predefined camera views 41n has the following characteristics:

Visibility: Each camera view 41n is portrayed as a live feed in a thumbnail image/graphical representation 19 to the user. Clicking on or otherwise selecting the thumbnail image/graphic 19 corresponding to the camera view 41n changes the current view 41 to the selected camera view. This thumbnail or user selectable display interface may be implemented by conventional code used to present thumbnail camera feeds, commonly available in existing graphics engines.

Manageability: The set of camera views 41n (and corresponding thumbnails 19) visible to the user is limited to a number that does not overwhelm the user interface, and redundant views are filtered out. This is implemented by defining a numerical limit to the number of visible corresponding thumbnails 19, and identifying user-defined and automatically identified views 41n to filter out. Automatically identified views to filter out can be computed based on similarity of camera angle, number of objects of interest in the scene, amount of change in the scene since the last camera capture, and the like.

Contextual by place: Some camera views 41n are offered from a set of predefined angles in the user's (avatar's 15) current place (location and/or orientation) in the virtual environment 11. This set of camera views 41n is computed from a combination of (i) a list of views defined by the author of the virtual place and (ii) a set of interesting angles identified for the virtual place. The invention system or processor routine 100 computes suitable camera views 41n by applying a set of heuristics that optimizes dramatic angle, maximum visibility of content in the scene, and best visibility of the user's avatar 15 in the scene.

Contextual by object: Some camera views 41n are offered from a set of predefined angles based on objects 13 of interest visible to the user in the virtual environment 11. This set of camera views 41n is computed from a combination of (i) a list of views defined by the author of the virtual object 13 and (ii) a set of interesting angles identified around a virtual object 13. The invention system 100 computes suitable views 41n by applying a set of heuristics that optimizes dramatic angle, maximum visibility of the object 13, and best visibility of the user's avatar 15 near the object 13.

Contextual by avatars: Some camera views 41n are offered from a set of predefined angles based on other users' avatars 13 of interest visible to the user in the virtual environment 11. This set of camera views 41n is computed from a combination of (i) a list of views defined by the author of the avatar 13 and (ii) a set of interesting angles identified around the avatar 13. The invention system 100 computes suitable views 41n by applying a set of heuristics that optimizes dramatic angle, maximum visibility of the avatar 13, and best visibility of interesting content near the avatar 13.

Contextual by current activities: Some camera views 41n are offered from a set of predefined angles based on the activity/task/workflow of interest currently engaged by the user or by other users in the immediate vicinity. This set of camera views 41n is computed from analyzing a streaming log of actions taken by avatars 13, 15 and automated processes in the immediate vicinity. Known technology for providing streaming logs of avatar actions and automated processes is used. In one embodiment, the virtual world 11 runs a process that continuously analyzes the stream of actions executed by avatars 13, 15 and automated processes. Actions in the analyzed stream that exceed a threshold of interest are marked and a suitable camera view 41n is computed based on the actors of the action (e.g. if the action was executed by an avatar 13, 15, use the algorithm/process for computing views around the avatar, as listed above). The set of predefined camera views 41*n* can then be assembled from camera views computed from the analysis of the stream of actions.

Contextual by other users' choices: Camera views that have been used, or are currently being used by other users in the same place are indicated. This set of camera views is computed from a log of camera view choices (candidates and/or selected and used ones) from users of the virtual world 11, with appropriate filtering (e.g. avatar's 15 current location). In one embodiment, the virtual world 11 maintains a history of camera view choices/candidates from users of the virtual world 11, as well as contextual details for each choice (e.g. location, time, activity, etc). Common data store and history store techniques are utilized.

Contextual by past navigation or activity: Some camera views 41*n* that are offered are based on places, people, objects, activities, and other camera selections that the user has selected in the past. Clicking on or otherwise selecting one of these camera views 41*n* not only changes the current view 41 to the selected camera view, but may potentially move the user back to a previous location, to a previous person, etc associated with the selected camera view. In essence, this is the equivalent of the "back" button of a web browser, but with a camera preview (thumbnail 19) associated with it. This set of camera views 41*n* is computed similarly to "contextual by current activities" described above, except instead of using an analysis of streaming log data, an analysis of the entire log history (or a large time window) is made. Additional details stored by the log may include a snapshot of the past environmental state of the scene taken by the camera in the past.

Shareable: Users' camera choices (e.g., selected camera views 41 and/or candidates 41*n*) are visible to others in the virtual environment 11, and can be saved and distributed for immediate or later use by others (e.g. newcomers who may want to use these cameras). Known data store and distribution techniques are used. In one embodiment this "sharing" feature is implemented as a service provided by the virtual environment 11 where camera view choices 41*n* computed by the methods listed above are made available to users.

Applicants contend that the advantages of this invention 100 leverages the advantages of preset cameras of virtual environments 11 (the user simply picks an appropriate camera/camera views 41*n* and does not need to learn a camera-positioning interface, or rely on potential problems in automatic camera algorithms), and offers a wider range of useful camera choices than a conventional set of preset cameras specific to a scene or an object 13.

In particular, showing what camera views are being and have been used by other users will help speed up the decision making process for picking an appropriate camera view, and offering camera views back to places and things in the past will ease backtracking in virtual environments 11.

After providing/generating the context based set of predefined camera views 41*n*, the invention system 100 enables the user to select any one of these camera views 41*n*. That is invention system 100 through a display member or interface (such as at 27 in FIG. 2) displays thumbnails 19 or other indications (dropdown list, menus, symbols, and the like) corresponding to the camera views 41*n* for user selection. Upon user selection of a corresponding thumbnail/indicator 19 of a camera view 41*n*, system 100 updates or otherwise changes the camera operation by switching to the user selected camera view 41*n*.

FIG. 2 is exemplary of the computer program (processor routines)/system 100 implementing embodiments of the present invention. Per user, a virtual environment camera system operates a respective camera (at 22) in the subject virtual environment 11, such as a virtual world. The initial part of camera operation 22 is supported by techniques common in the art. In step 23, the camera system 100 detects and determines current context with respect to a user. In particular, step 23 detects the user avatar's 15 environment, objects 13 of interest in the current scene, and camera views that other users have found interesting. In addition, step 23 considers specific moments of interest in the past of the user's. Using these factors, step 23 determines a current context.

Step 25 generates or otherwise provides a set of predefined camera views 41*n* as a function of the determined current context. The type of camera views per context vary by (place, objects 13, avatars 13, 15, current activities, other user's camera view choices and past navigational activity) as discussed above.

Step 27 filters the number of camera views 41*n* generated by step 25 and displays the filtered set (e.g., thumbnails 19 or other indicators thereof) to the user for selection of a camera view. Preferably, the display member/interface of step 27 displays to the user a set of predefined camera views 41*n* and indications of other users' camera choices as saved and distributed (discussed above).

In one embodiment step 27 displays to the user thumbnail sketches 19 of the different predefined camera views 41*n* in the set generated by step 25. Using the thumbnail sketch interface, the user makes a selection of desired camera view 41*n* for the current scene and activities in the subject virtual environment 11. Other indicators instead of thumbnail sketches 19 and other interfaces are suitable.

Step 29 is responsive to user selection from and interaction with the displayed set of candidate camera views 41*n* of step 27, and changes or otherwise updates and maintains camera view in the subject virtual environment 11 according to user command (selection).

Throughout the user's session, steps 23, 25, 27 and 29 are repeated to refresh the camera view 41 of the user in the virtual environment 11 based on the user's current context.

Figure 3:
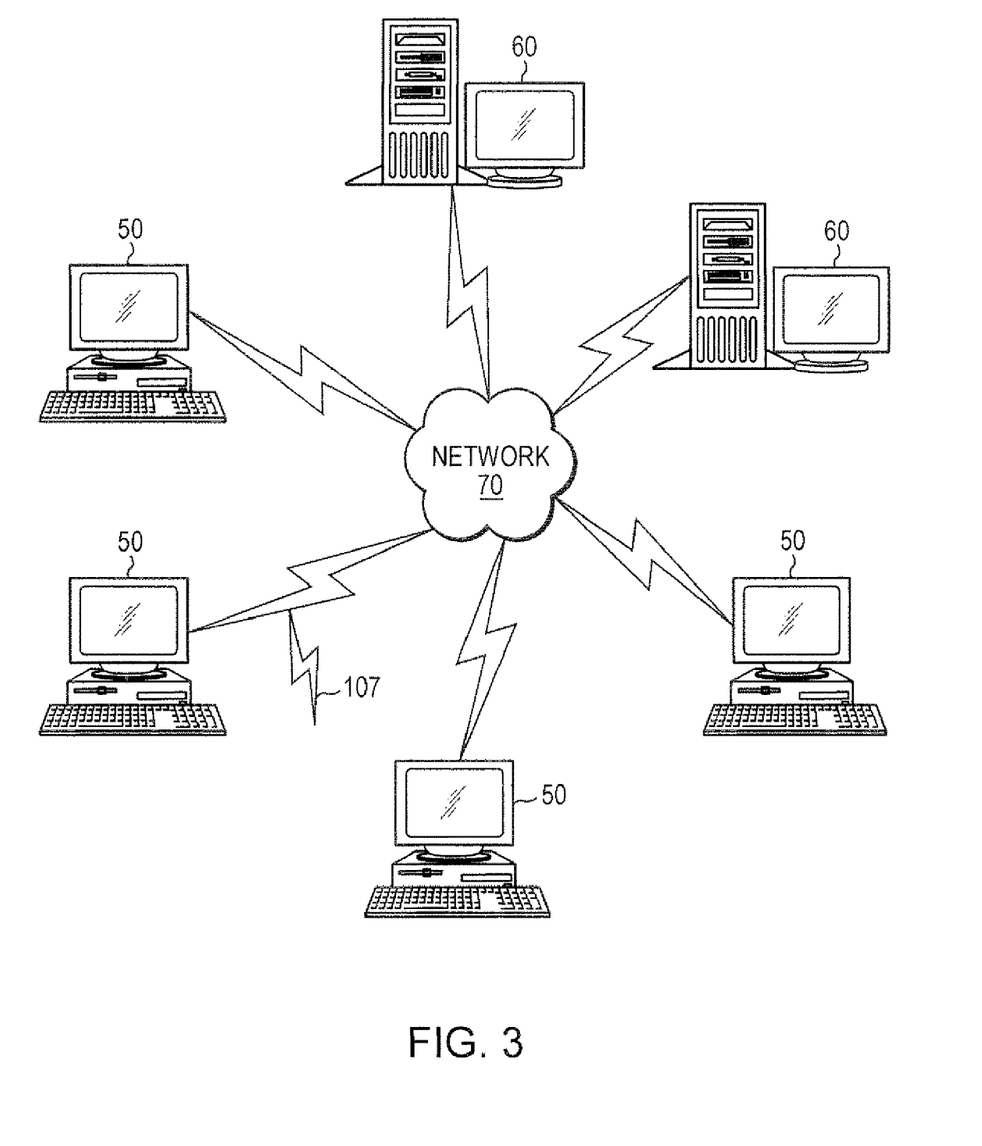
FIG. 3 is a schematic view of a computer network environment in which embodiments of the present invention are implemented.

FIG. 3 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
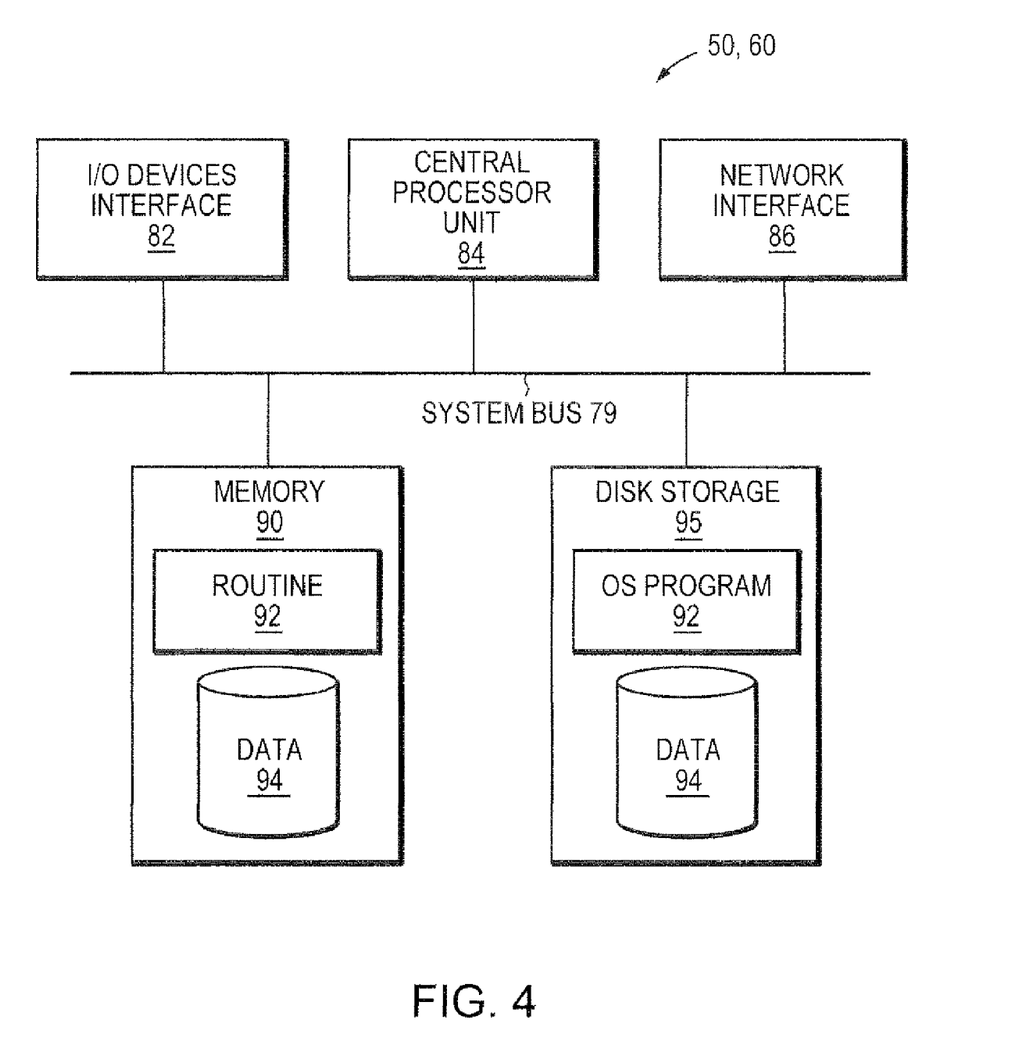
FIG. 4 is a block diagram of a computer node in the network of FIG. 3.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., current context determinator 23, source of predefined camera view sets 41n, user interface/thumbnails 19 and 27, and camera control system code 100 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

For example, other computer architectures and configurations are suitable. Those of FIGS. 3 and 4 are for non-limiting, illustrative purposes.

Where this disclosure refers to "virtual worlds," virtual reality simulation, 3D video gaming, other video gaming and the like are included. Similarly, the terms avatar, character, and actor are treated equivalently.

What is claimed is:

1. A computer method of controlling virtual environment cameras comprising:

in a processor, determining current context in a subject virtual environment, an acting character in the subject virtual environment representing a user, and point of view of a given screen view of the subject virtual environment being through the eyes of the acting character as captured through a hypothetical camera;

as a function of determined context, providing to the user a set of certain predefined camera views for the hypothetical camera through which his character's point of view in the subject virtual environment is defined, each predefined camera view in the set being individually user selectable, wherein different respective sets of predefined camera views are provided for different determined contexts, and each set of predefined camera views is computed from a combination of: (i) a list of views defined by any of an author of current location of the user's character in the subject virtual environment, an author of an object of interest visible to the user's character in the subject virtual environment, and an author of the user's character, and (ii) interesting angles identified around the respective ones of the current location, object of interest and user's character;

enabling user selection of a camera view from the provided set of certain predefined camera views, wherein the provided set of certain predefined camera views include camera views having angles based on avatars of interest that are visible to the user through his character in the subject virtual environment, and wherein user selection is through user selectable graphical representations of each camera view in the provided set of predefined camera views; and updating the hypothetical camera of the subject virtual environment according to user selected camera view; and outputting on a display member to the user a screen view of the subject virtual environment as defined by the updated hypothetical camera and user selected camera view.

2. A method as claimed in claim 1 wherein the current context is determined by any one or a combination of:
the user's character's environment in the subject virtual environment;
objects of interest, as expressed through the user's character, in a scene of the subject virtual environment;
camera views that other users find interesting; and
certain moment of interest in the past.

3. A method as claimed in claim 1 further comprising filtering number of camera views included in the provided set of predefined camera views for user selection.

4. A method as claimed in claim 1 wherein the provided set of predefined camera views includes camera views having angles similar to angles in the user's character's current location in the subject virtual environment.

5. A method as claimed in claim 1 wherein the provided set of predefined camera views includes camera views having angles based on objects of interest that are visible to the user's character in the subject virtual environment.

6. A method as claimed in claim 1 wherein the provided set of predefined camera views includes camera views having angles based on an activity, task or workflow of interest currently engaged by the user's character or by other users' characters.

7. A method as claimed in claim 1 wherein the provided set of predefined camera views includes camera views that have been used or are currently being used by other users' characters in the subject virtual environment.

8. A method as claimed in claim 1 wherein the provided set of predefined camera views includes camera views based on places, people, objects, activities and other camera views that the user has selected in the past.

9. A method as claimed in claim 1 further comprising making selected camera views of the user visible to other users in the subject virtual environment.

10. A method as claimed in claim 1 wherein the subject virtual environment includes any of a virtual world, 3D games, video games, and virtual reality simulation.

11. Computer apparatus for controlling virtual environment cameras, comprising:
a detector determining current context in a virtual environment, an acting character in the virtual environment representing a user, and point of view of a given screen view of the virtual environment being through the eyes of the acting character as captured through a hypothetical camera;
a source of predefined camera views for the hypothetical camera through which the user's character's point of view in the virtual environment is defined, the source providing different sets of certain predefined camera views for different respective context, and each certain predefined camera view being individually user selectable,
wherein each set of predefined camera views is computed from a combination of: (i) a list of views defined by any of an author of current location of the user's character in the subject virtual environment, an author of an object of interest visible to the user's character in the subject virtual environment, and an author of the user's character, and (ii) interesting angles identified around the respective ones of the current location, object of interest and user's character;
a display member responsive to the detector and displaying to the user a set of certain predefined camera views as a function of determined current context, for selection of a camera view by the user, and the display member displaying to the user a respective user selectable graphical representation of each camera view in the displayed set, wherein the displayed set of certain predefined camera views include camera views having angles based on avatars of interest that are visible to the user through his character in the virtual environment; and
a controller responsive to user selection of the respective user selectable graphical representation of a camera view from the displayed set, the controller changing camera view of the hypothetical camera of the virtual environment based on the user selected camera view, and the changed camera view of the hypothetical camera outputting on a display monitor to the user a screen view of the virtual environment as defined by the user selected camera view.

12. Computer apparatus as claimed in claim 11 wherein the current context is determined by any one or a combination of:
the user's character's environment in the virtual environment;
objects of interest, as expressed through the user's character, in a scene of the virtual environment;
camera views that other users find interesting; and
certain moment of interest in the past.

13. Computer apparatus as claimed in claim 11 further comprising a filter for filtering number of camera views displayed in the set of predefined camera views by the display member.

14. Computer apparatus as claimed in claim 11 wherein the displayed set of predefined camera views includes camera views having angles similar to angles in the user's character's current location in the virtual environment.

15. Computer apparatus as claimed in claim 11 wherein the displayed set of predefined camera views includes camera views having angles based on objects of interest that are visible to the user's character in the virtual environment.

16. Computer apparatus as claimed in claim 11 wherein the displayed set of predefined camera views includes camera views having angles based on an activity, task or workflow of interest currently engaged by the user user's character or by other users' characters.

17. Computer apparatus as claimed in claim 11 wherein the displayed set of predefined camera views includes camera views that have been used or are currently being used by other users' characters in the virtual environment.

18. Computer apparatus as claimed in claim 11 wherein the displayed set of predefined camera views includes camera views based on places, people, objects, activities and other camera views that the user has selected in the past.

19. Computer apparatus as claimed in claim 11 wherein the display member further makes visible to other users the camera views selected by the user.

20. Computer apparatus as claimed in claim 11 wherein the subject virtual environment includes any of a virtual world, 3D games, video games, and virtual reality simulation.

21. A computer program product comprising a computer usable storage medium having a computer readable program, wherein the computer readable program when executed on a computer causes:
   determining current context in a subject virtual environment, the subject virtual environment having an acting character representing a user, and point of view of a given screen view of the subject virtual environment being through the eyes of the acting character as captured through a hypothetical camera;
   as a function of determined context, providing to the user a set of certain predefined camera views for the hypothetical camera through which his character's point of view in the subject virtual environment is defined, each predefined camera view in the set being individually user selectable, wherein different respective sets of predefined camera views are provided for different determined contexts, and each set of predefined camera views is computed from a combination of: (i) a list of views defined by any of an author of current location of the user's character in the subject virtual environment, an author of an object of interest visible to the user's character in the subject virtual environment, and an author of the user's character, and (ii) interesting angles identified around the respective ones of the current location, object of interest and user's character;
   enabling user selection of a camera view from the provided set of certain predefined camera views, wherein the provided set of certain predefined camera views includes camera views having angles based on avatars of interest that are visible to the user through his character in the subject virtual environment, and wherein user selection is through user selectable graphical representations of each camera view in the provided set of predefined camera views;
   updating the hypothetical camera of the subject virtual environment according to user selected camera view; and
   outputting on a display member to the user a screen view of the subject virtual environment as defined by the updated hypothetical camera and user selected camera view.

22. A virtual environment camera controller comprising:
   detector means for detecting current context in a virtual environment, the virtual environment having an acting character representing a user, and point of view of a given screen view of the virtual environment being through the eyes of the acting character as captured through a hypothetical camera;
   camera view means for providing to a user different sets of certain predefined camera views as a function of detected context, the predefined camera views being used by the hypothetical camera through which the user's character's point of view in the virtual environment is defined, each predefined camera view in each set being individually user selectable, wherein different respective sets of predefined camera views are provided for different determined contexts, and each set of predefined camera views is computed from a combination of: (i) a list of views defined by any of an author of current location of the user's character in the virtual environment, an author of an object of interest visible to the user's character in the virtual environment, and an author of the user's character, and (ii) interesting angles identified around the respective ones of the current location, object of interest and user's character;
   user interface means for indicating to a user a set of certain predefined camera views as a function of detecting current context, the user interface means displaying to the user a respective user selectable graphical representation of each camera view in the indicated set and enabling the user to select a camera view from the indicated set by the user selecting the respective displayed user selectable graphical representation, wherein the provided set of certain predefined camera views include camera views having angles based on avatars of interest that are visible to the user's character in the virtual environment; and
   means for changing camera view of the hypothetical camera in the virtual environment to the user selected camera view, and the changed camera view outputting on a display monitor to the user a screen view of the virtual environment as defined by the user selected camera view.

* * * * *